(12) United States Patent
Vakrat et al.

(10) Patent No.: US 7,334,162 B1
(45) Date of Patent: Feb. 19, 2008

(54) DYNAMIC DISTRIBUTION OF TEST EXECUTION

(75) Inventors: Yaniv Vakrat, Ashdod (IL); Victor Rosenman, Tel-Aviv (IL)

(73) Assignee: Sun Microsystems, Inc., Santa Clara, CA (US)

( * ) Notice: Subject to any disclaimer, the term of this patent is extended or adjusted under 35 U.S.C. 154(b) by 479 days.

(21) Appl. No.: 10/767,845

(22) Filed: Jan. 29, 2004

Related U.S. Application Data

(60) Provisional application No. 60/443,795, filed on Jan. 29, 2003.

(51) Int. Cl.
*G06F 11/00* (2006.01)

(52) U.S. Cl. .......................................... 714/38; 717/124

(58) Field of Classification Search ................... 714/38
See application file for complete search history.

(56) References Cited

U.S. PATENT DOCUMENTS

| | | | |
|---|---|---|---|
| 5,922,079 A | 7/1999 | Booth et al. | |
| 6,002,868 A | 12/1999 | Jenkins et al. | |
| 6,167,352 A | 12/2000 | Kanevsky et al. | |
| 6,219,829 B1 | 4/2001 | Sivakumar et al. | |
| 6,311,149 B1 | 10/2001 | Ryan et al. | |
| 6,378,088 B1 | 4/2002 | Mongan | |
| 6,385,741 B1 | 5/2002 | Nakamira | |
| 6,393,591 B1 | 5/2002 | Edmondson et al. | |
| 6,397,378 B1 | 5/2002 | Grey et al. | |
| 6,449,731 B1 | 9/2002 | Frey, Jr. | |
| 6,560,721 B1 | 5/2003 | Boardman et al. | |
| 6,708,324 B1 * | 3/2004 | Solloway et al. | ............ 717/124 |
| 6,839,647 B2 | 1/2005 | Volkov et al. | |
| 6,847,916 B1 | 1/2005 | Ying | |
| 6,868,508 B2 | 3/2005 | Grey | |
| 2001/0053961 A1 | 12/2001 | Liu et al. | |
| 2001/0054161 A1 | 12/2001 | Wooddruff | |
| 2002/0133749 A1 | 9/2002 | Petersen et al. | |
| 2003/0131285 A1 * | 7/2003 | Beardsley et al. | ............ 714/38 |
| 2004/0153774 A1 * | 8/2004 | Gavish et al. | ................. 714/25 |

OTHER PUBLICATIONS

Safari Books Online—http://proquest.safaribooksonline.com/print?xmlid=059600253x/j2meanut-chp-9-sect-1.*

(Continued)

*Primary Examiner*—Yolanda L Wilson
(74) *Attorney, Agent, or Firm*—Meyertons Hood Kivlin Kowert & Goetzel, P.C.; B. Noël Kivlin

(57) ABSTRACT

Computing devices are tested by providing a suite of test programs on a server for execution by a plurality of identical computing devices that are coupled to the server. A respective unique identifier is assigned to each of the plurality of the computing devices, for use in communicating with the server. The test programs are downloaded from the server for execution by the computing devices coupled thereto, so that at different computing devices execute different test programs substantially simultaneously. The server receives messages from the computing devices with respect to execution of the test programs, each of the messages containing the respective unique identifier, and controls the execution of the test programs in the suite based on the messages. The server dynamically distributes the test programs to a changing population of the computing devices, optimizing the distribution so as to minimize the time to complete the suite.

31 Claims, 4 Drawing Sheets

OTHER PUBLICATIONS

U.S. Appl. No. 10/767,850, filed Jan. 29, 2004.
U.S. Appl. No. 10/767,849, filed Jan. 29, 2004.
U.S. Appl. No. 10/767,851, filed Jan. 29, 2004.
U.S. Appl. No. 10/767,848, filed Jan. 29, 2004.
U.S. Appl. No. 10/767,846, filed Jan. 29, 2004.

* cited by examiner

DYNAMIC DISTRIBUTION OF TEST EXECUTION

CROSS-REFERENCE TO RELATED APPLICATIONS

This application claims the benefit of Provisional Application No. 60/443,795, filed Jan. 29, 2003. This application is related to application Ser. No. 10/767,850, filed on even date, entitled Parallel Test Execution on Low-End Emulators and Devices.

BACKGROUND OF THE INVENTION

1. Field of the Invention

The present invention relates generally to hardware and software testing and verification, and specifically to testing software on low-end emulators and computing devices.

2. Description of the Related Art

The meanings of acronyms and certain terminology used herein are given in Table 1:

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTTP | HyperText Transfer Protocol |
| ID | Identifier |
| IP | Internet Protocol |
| J2EE | Java 2 Enterprise Edition |
| J2ME | Java 2 Micro Edition |
| J2SE | Java 2 Standard Edition |
| JAD | Java application descriptor |
| JAR | Java archive |
| JDTS | Java Device Test Suite Execution Framework |
| MIDlet | A MIDP application |
| MIDP | Mobile information device profile. A set of Java APIs, which, together with the CLDC, provides a complete J2ME application runtime environment targeted at mobile information devices. |

MIDP is defined in Mobile Information Device Profile (JSR-37), JCP Specification, Java 2 Platform, Micro Edition, 1.0a (Sun Microsystems Inc., Palo Alto, Calif., December 2000). MIDP builds on the Connected Limited Device Configuration (CLDC) of the Java 2 Platform, Micro Edition (J2ME) (available from Sun Microsystems Inc., Palo Alto, Calif.). The terms Sun, Sun Microsystems, Java, J2EE, J2ME, J2SE, and the Sun logo are trademarks or registered trademarks of Sun Microsystems, Inc., in the United States of America and other countries. All other company and product names may be trademarks of their respective companies. A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, in order to test a device under development (such as a mobile information device), or to test software designed to run on such a device, a developer connects the device to an appropriate test system. The target device under test may be connected to the test system either directly or via a communication emulator. The developer selects a battery of test programs to run on the target device while monitoring its behavior. Running the complete battery of tests can commonly take many hours or even days. This problem is particularly acute in testing low-end computing devices, such as cellular telephones and other mobile information devices, which have limited computing power and memory resources. Thus, testing on the target device can become a serious bottleneck in the development cycle.

A centralized system for centrally managing test suites is disclosed in commonly assigned application Ser. No. 10/767,849, entitled "Automated Test Execution Framework with Central Management", which is herein incorporated by reference. In this arrangement, a central repository contains a management unit, available test suites and a single test execution harness or framework. Using the management unit, a system administrator establishes active versions of the various test suites and their individual configurations. End users install clients of the central repository, using a system-provided installer program. In each client, an execution script is created, which downloads the harness and a local configuration file. Then, when the harness is executed at the client, it loads with all designated test suites already installed, configured and ready for execution. The client always has the most current versions of all test suites. Advantageously, all necessary information is obtained from a single central location.

A further improvement in test suite management is disclosed in commonly assigned application Ser. No. 10/767,850, entitled "Parallel Test Execution on Low-End Emulators and Devices", which is herein incorporated by reference. While this arrangement facilitates testing large numbers of devices simultaneously, it does not optimally reduce the time required for the verification phase of the development cycle. This is particularly the case where a developer wishes to exhaustively test a device or software program using a very large number of different tests.

SUMMARY OF THE INVENTION

Embodiments of the present invention provide methods and systems for parallel testing of multiple low-end computing devices, such as mobile information devices in which different tests in a test suite are dynamically allocated to different instances of a computing device-under-test. Multiple instances of a computing device-under-test are connected to a test server, either directly or via an emulator. Each of the devices is assigned a unique identifier (ID), which allows the server to keep track of which tests have been assigned to and carried out by each device. Whenever a device completes a test (or a bundle of tests), it reports the results to the server and requests the next text to execute, using its ID in the messages that it sends to the server. Based on the ID and the report, the server selects the next test or test bundle to assign to this device. This mechanism enables the server to dynamically distribute different elements of a test suite to the different instances of the computing devices-under-test, and to balance and track the load of testing among an arbitrarily large number of client devices. The distribution of the load is optimized for completion of the test suite in minimal time. According to the invention, the realistic possibilities of failure of particular instances of the computing device-under-test, and the availability of additional computing devices in the course of the verification process are accommodated. The load of tests is dynamically redistributed to a changing population of computing devices-under-test, that is while tests are currently running in the devices. Upon completion of the tests, the execution framework aggregates the results returned by all of the devices-under-test into a single set of results, and produces a consolidated report. With this arrangement, the test suite can be completed in far less time than is required by test systems known in the art. For example, dividing a test suite of 1000 tests among four devices can reduce the run time by up to a factor of four.

The invention provides a method for testing computing devices, which is carried out by providing a suite of test programs on a server for execution by a plurality of the computing devices that are coupled to the server, distributing different ones of the test programs from the server to the computing devices for concurrent execution thereof, receiving messages from the computing devices upon completion of the different test programs, and responsively to the messages, iteratively distributing the test programs until all of the test programs in the suite have been executed.

According to an aspect of the method, the test programs are distributed as JAR files and JAD files.

According to an additional aspect of the method, the JAD files are constructed responsively to the messages.

Another aspect of the method includes coupling a new computing device to the server, and reallocating the test programs to the computing devices and the new computing device.

One aspect of the method includes detaching one of the computing devices from the server, and marking unexecuted ones of the test programs that were distributed to the detached computing device as "not run".

In a further aspect of the method the different test programs are distributed by removal of the test programs from a stack.

Yet another aspect of the method distributing includes assigning the different test programs in groups, so as to minimize completion time of the suite.

The invention provides a computer software product, including a computer-readable medium in which computer program instructions are stored, which instructions, when read by a computer, cause the computer to perform a method for testing computing devices, which is carried out by accessing a suite of test programs on a server for execution by a plurality of the computing devices that are coupled to the server, distributing different ones of the test programs from the server to the computing devices for concurrent execution thereof by the computing devices, receiving messages from the computing devices upon completion of respective the different ones of the test programs, and responsively to the messages, iteratively distributing remaining test programs until all of the test programs in the suite have been executed.

The invention provides a method for testing computing devices, which is carried out by providing a suite of test programs on a server for execution by a plurality of the computing devices that are coupled to the server, assigning a respective unique identifier to each of the plurality of the computing devices for use in communicating with the server, making respective allocations of different ones of the test programs for the computing devices, downloading the allocations from the server for respective execution by the computing devices coupled thereto, so that at least first and second computing devices among the plurality execute different first and second test programs from the suite substantially simultaneously. The method is further carried out by receiving messages at the server from the computing devices with respect to the execution of the test programs, each of the messages containing the respective unique identifier, and responsively to each of the messages, downloading at least another of the test programs to a respective one of the computing devices.

According to an aspect of the method, the computing devices comprise MIDP-compliant devices, and wherein the test programs comprise MIDlets, which are packaged in respective JAD files and JAR files, and wherein allocating the test programs includes downloading the JAD files and the JAR files to the MIDP-compliant devices.

The invention provides a computer software product, including a computer-readable medium in which computer program instructions are stored, which instructions, when read by a computer, cause the computer to perform a method for testing computing devices, which is carried out by accessing a suite of test programs that are stored on a server for execution by a plurality of the computing devices that are coupled to the server, assigning a respective unique identifier to each of the computing devices, for use in communicating with the server, making respective allocations including different ones of the test programs for the computing devices, downloading the allocations from the server for respective execution by the computing devices coupled thereto, so that at least first and second computing devices among the plurality execute different first and second test programs from the suite substantially simultaneously, receiving messages at the server from the computing devices with respect to the execution of the test programs, each of the messages containing the respective unique identifier, and responsively to each of the messages, returning a new allocation of unexecuted ones of the test programs to respective ones of the computing devices for execution thereof.

The invention provides a server for testing computing devices, including a communication interface for coupling a plurality of the computing devices thereto, and a processor having instructions to access a suite of test programs for execution by the computing devices that are coupled to the server, and to distribute at least a portion of different ones of the test programs via the communication interface to respective ones of the computing devices for concurrent execution thereof. The processor has further instructions to receive messages via the communication interface from the computing devices indicating completion of the test programs, and responsively to the messages, to distribute remaining ones of the test programs to the computing devices for execution thereof iteratively until all of the test programs in the suite have been executed.

The invention provides a server for testing computing devices, including a communication interface for coupling a plurality of the computing devices thereto, and a processor having instructions to access a suite of test programs for execution by the computing devices that are coupled to the server, to assign a respective unique identifier to each of the plurality of the computing devices for use in communicating with the server, to make respective allocations including different ones of the test programs for the computing devices, to download the allocations from the server for respective execution by the computing devices coupled thereto, so that at least first and second computing devices among the plurality execute different first and second test programs from the suite substantially simultaneously. The processor has further instructions to receive messages from the computing devices indicating completion of the execution of the test programs, each of the messages containing the respective unique identifier, and responsively to the messages to distribute remaining ones of the test programs iteratively to the computing devices for execution thereof.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Figure 1:
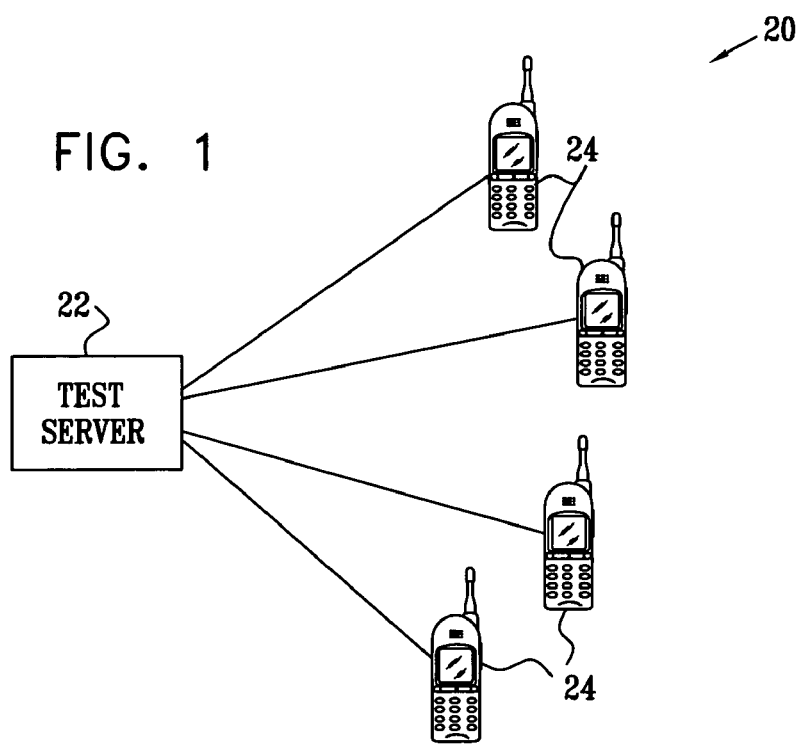
FIG. 1 is a block diagram that schematically illustrate systems for parallel testing of low-end computing devices, in accordance with an embodiment of the present invention.

Reference is now made to FIG. 1, which is a block diagram that schematically illustrates a system 20 for parallel testing of multiple mobile information devices 24, in accordance with an embodiment of the present invention. The system 20 is built around a test server 22, which is described in greater detail hereinbelow. The devices 24 are client devices, and are typically low-end devices, with limited computing power and memory, for example, cellular telephones or personal digital assistants (PDA's). In the description that follows, the devices 24 are assumed to comply with MIDP, but the principles of the present invention are equally applicable to other types of low-end computing devices, operating in accordance with other standards and specifications. The server 22 typically comprises a programmable processor, and has suitable communication interfaces, such as wireless or wired interfaces, for communicating with multiple devices 24 simultaneously.

Each of the devices 24 receives a unique identifier for communicating with the server 22. Typically, the unique identifier may comprise a unique Internet Protocol (IP) address that is assigned to each of the devices 24 for communicating with the server 22. Alternatively, the server may assign IDs of other types, or the ID's may be assigned by a user upon initiating communication between one or more of the devices 24 and the server 22. Methods for assigning and using these IDs are described in detail hereinbelow.

Figure 2:
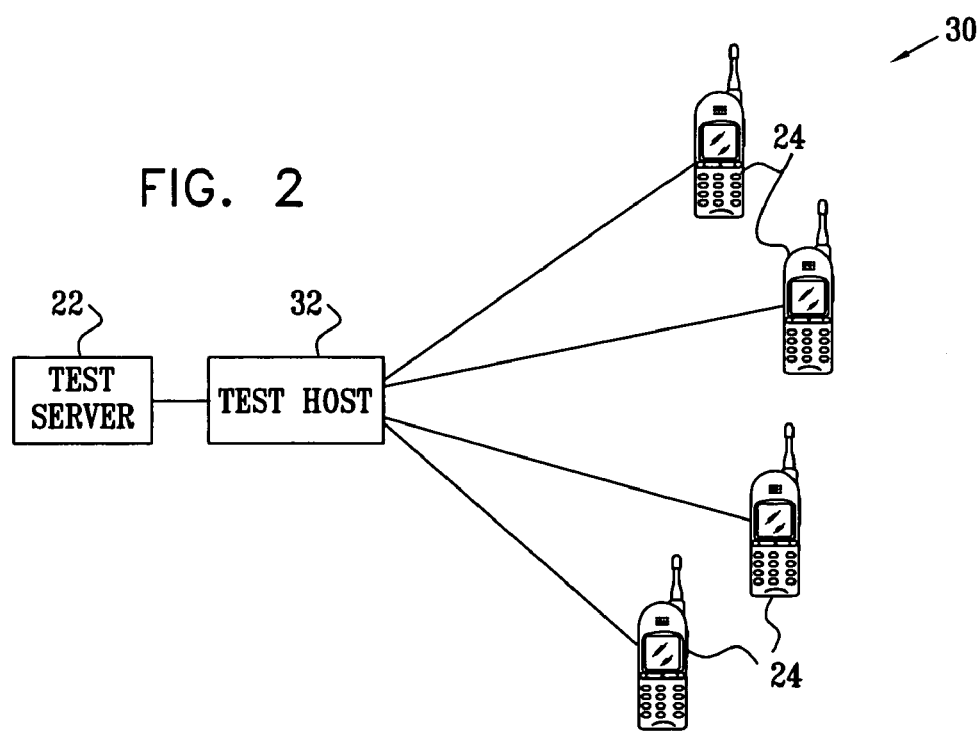
FIG. 2 is a block diagram that schematically illustrate systems for parallel testing of low-end computing devices, in accordance with an alternate embodiment of the pre-sent invention.

Reference is now made to FIG. 2, which is a block diagram that schematically illustrates a system 30 for parallel testing of multiple devices 24, in accordance with another embodiment of the present invention. In this embodiment, the server 22 communicates with the devices 24 through a test host 32, such as a personal computer or workstation. Multiple test hosts of this sort may be connected to the server 22 in parallel, but only a single host is shown in FIG. 2 for the sake of simplicity. The host 32 can simultaneously accommodate multiple devices 24, but the host 32 typically has only a single IP address. Therefore, in this embodiment, the IP address cannot be used conveniently to identify the individual devices 24, and an alternative unique identifier is typically used, as described below.

Figure 3:
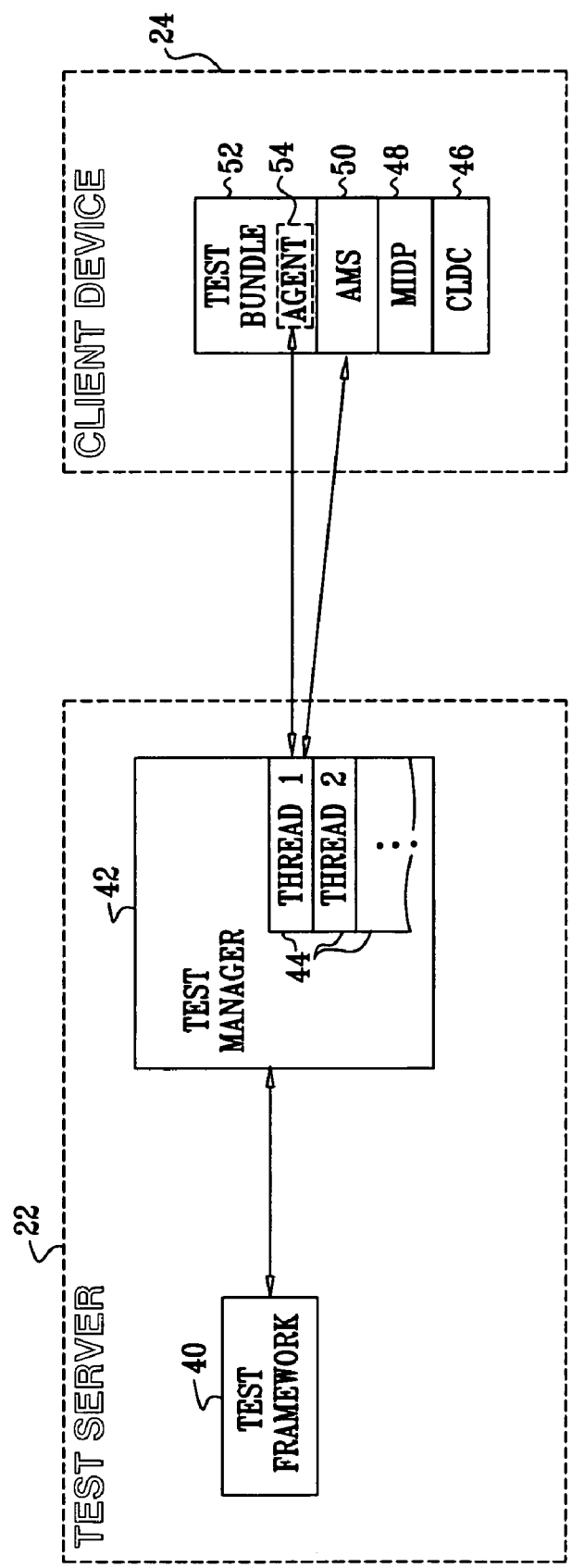
FIG. 3 is a block diagram that schematically illustrates program components used in a test system, in accordance with an embodiment of the present invention.

Reference is now made to FIG. 3, which is a block diagram that schematically illustrates software program components running on the server 22 and the devices 24, in accordance with an embodiment of the present invention. Elements of this software may be provided to the server 22 and to the devices 24 on tangible media, such as optical or magnetic storage media or semiconductor memory chips. The software may be downloaded to the server 22, and alternatively or additionally, to the devices 24 in electronic form, for example, over a network or over the air.

The server 22 comprises a test framework 40, which generates and deploys the tests to be carried out by the devices 24. The test framework 40 may be implemented as the "Java Device Test Suite" execution framework (JDTS) (version 1.0 or higher), available from Sun Microsystems, Inc., which employs MIDP. A suitable version of the test framework 40 is described, for example, in the above-mentioned application Ser. No. 10/767,849, which is commonly assigned herewith, and is herein incorporated by reference.

The tests typically are packaged in the form of Java applications contained in a set of JAD and JAR files. Each JAR file of this sort, together with its accompanying JAD file, is referred to hereinbelow as a test bundle 52. Users of the system 20 (FIG. 1) or the system 30 (FIG. 2) interact with the test framework 40 in order to select the tests to be executed by the system. Alternatively, other test frameworks may be used for generating the required test files, as will be apparent to those skilled in the art.

A test manager 42 in the server 22 is responsible for serving requests from the devices 24, based on the unique client identifiers mentioned above. Typically, whenever one of the devices 24 makes a request, the test manager 42, typically operating as a main thread, reads the request and assigns a new thread 44 to handle it. This thread 44 retrieves the client unique identifier from the request, calls the components of the test framework 40 that are needed to process the request, and then returns the appropriate response to the client device, as described hereinbelow. After assigning the thread 44 to handle the client, the main thread of the test manager 42 waits for the next client request. Each client request is handled by a separate thread 44, which terminates upon completion of processing. This arrangement, together with the unique identifier mechanism, ensures that the server 22 will be able to handle multiple devices 24 simultaneously without confusion.

In order to run Java applications, the devices 24 contain an implementation of the Connected Limited Device Configuration specification, CLDC 46, with an implementation of the Mobile Information Device Profile specification, MIDP 48, running over the CLDC 46. The applications that run on this technology, such as the tests supplied by framework 40, are known as MIDlets. These applications are created by extending an API MIDlet class of the MIDP 48. Thus, each test bundle 52 is actually a MIDlet, packaged in the form of a JAD/JAR file pair.

The test bundle 52 is typically downloaded to the devices 24 in a two-step process:

1. The server 22 downloads the JAD file, which contains environment settings and some environment demands. Application Manager Software, AMS 50, which is typically a part of a browser built into the devices 24, evaluates the JAD file to ensure that the device is able to accept the MIDlet. For example, the JAD file for a given MIDlet may specify that the device must support MIDP version 2.0. If the device does not support this version, the AMS 50 rejects the application download, and saves the time that would otherwise be consumed by downloading the much larger JAR file.
2. After completing all the relevant checks, the AMS 50 reads from the JAD file the location of the corresponding JAR file on the server 22 and asks to download the JAR file to one or more of the devices 24. The JAR file contains all the relevant classes of the test bundle 52.

Once the JAR file for the test bundle 52 is downloaded to one of the devices 24 and stored in the local device memory, the device is ready to run the tests of the test bundle 52. Every JAR file that the AMS 50 downloads to the devices 24 typically contains an agent 54, which is used to run the tests, in addition to classes corresponding to the tests themselves. To start test execution the AMS 50 runs the agent class. The agent 54 then addresses the server 22 in order to receive instructions regarding the next test to run (getNextTest) and to report test results (sendTestResult), typically using a protocol based on HTTP. Each test in the test bundle 52 corresponds to a respective class in the JAR file. Each client request that is addressed by the agent 54 to the server 22 includes the unique identifier that has been assigned to the particular one of the devices 24, so that the server 22 is able to recognize the client and serve it in the correct manner.

Implementation Details.

Further details of the implementation of the server 22 are given in Listing 1 (class BaseHttpServer). An implementation of the communications interface through which requests and messages are transmitted between the server 22 and the devices 24 is detailed in Listing 2 (class Communicator). Runtime generation of JAD files by the server 22 is accomplished using Listing 3 (class HttpServer). Launching of the agent 54 is detailed in Listing 4 (class MIDPRunner). Implementation of the thread 44 is detailed in Listing 5 (class ServerTaskThread).

Listing 6 shows a class (class Extender) that is needed by the classes shown in Listings 1-5. A brief description of Listing 6 follows.

A public interface Extender provides access to a class Extender. The class Extender enables an agent link with platforms that require extensions of their main application class, for example to properly employ a system class, such as class Applet or class MIDlet. The class Extender accepts delegation of platform specific commands from an agent.

The interface Extender includes the following methods. A method getRunnerExtender retrieves a reference to a platform class, which the main application class extends. Using this method, an agent provides access to the test program by the main application class in the context in which it is currently executing. An object is returned, which can be cast to the system class that the extender class extends. A method terminateAgent provides a platform-specific way of application termination.

It will be understood that Listings 1-6 are exemplary, and that the functions and operations shown therein can be accomplished using other techniques known to the art.

Figure 4:
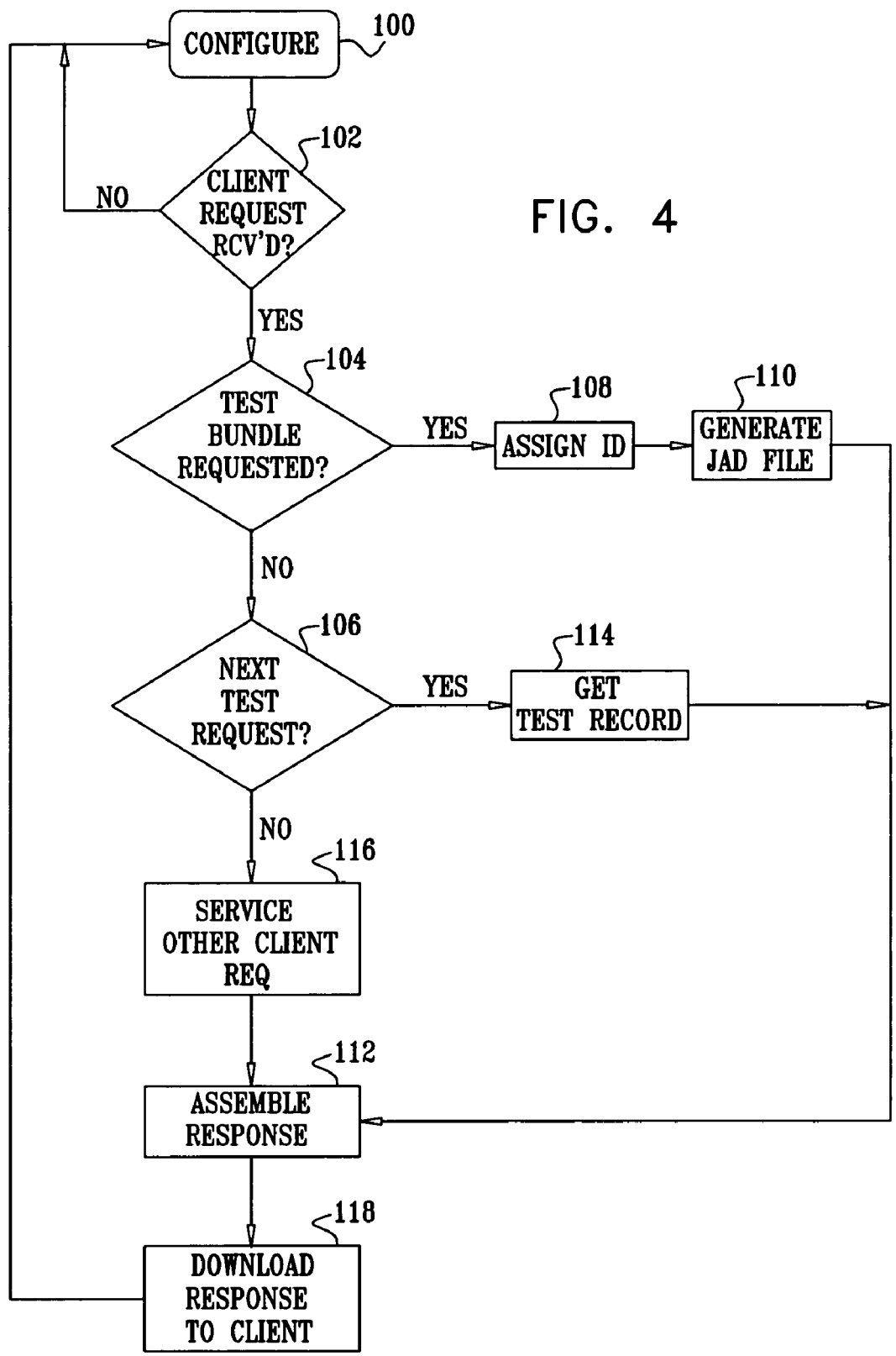
FIG. 4 is a flow chart that schematically illustrates a method for parallel testing of low-end computing devices, in accordance with an embodiment of the present invention.

Reference is now made to FIG. 4, which is a high level flow chart that schematically illustrates a method for running test suites on multiple client devices 24 in the system 20 (FIG. 1) or the system 30 (FIG. 2), in accordance with an embodiment of the present invention. For clarity of presentation, the flow chart in FIG. 4 presents an interaction involving only a single client request. However, the method can be performed simultaneously, with many clients. Indeed, different devices may be executing different tests, or even different test suites or test bundles at any given time. This method is explained with reference to the software structures shown in FIG. 3, although other implementations are also possible, as will be apparent to those skilled in the art. The method begins at initial step 100, which is a configuration step. A server is attached to a plurality of client devices to be tested using suitable communications links.

Next, at delay step 102 the server awaits a request from a client. As will be apparent from the discussion below, the request could be for a new test bundle, or for the next test in a test bundle that is currently executing.

Upon receipt of a client request, control proceeds to decision step 104. Here it is determined whether the client request received at delay step 102 is a request for a new test bundle. This is normally the case when the client is first recognized by the server. Otherwise, such a request can occur if a previous test bundle has been completed by a client already known to the server according to its unique identifier.

If the determination at decision step 104 is negative, then generally, the server is already aware of the requesting client. Control proceeds to decision step 106, which is disclosed below.

If the determination at decision step 104 is affirmative, it is concluded that the server has not previously interacted with the requesting client. Control proceeds to step 108. Here a unique identifier is assigned to the requesting client. Whichever of the alternate methods disclosed herein for making the assignment is employed, the client is uniquely identified at step 108, and its subsequent requests and results will be handled without possibility of confusion with other currently attached clients. As noted above different clients may be identically configured, and may even be concurrently executing the same test bundle. Furthermore, any test results reported by the now uniquely identified client are accurately associated with that particular client so as to guarantee the integrity of test reports that may be eventually generated by the server. Control now proceeds to step 110.

At step 110 a JAD file corresponding to the client request is generated or selected by the server for transmission to the client. Control then proceeds to step 112, which is disclosed below.

Decision step 106 is performed when the determination at decision step 104 is negative. Here it is determined if the client request received at delay step 102 is a request for the next test to be executed in a current test bundle. Such requests may be generated at the client responsively to evaluation at the client of a previously downloaded JAD file, based on suitability of the tests for the particular client.

If the determination at decision step 106 is affirmative, then control proceeds to step 114. The server retrieves the test record that corresponds to the next test to be executed by the client. It will be apparent that this mechanism provides a high degree of central control by the server, so as to optimize the order of test execution by different clients. For example, if the server has received borderline test results from the client, it could elect to repeat a particular test, or to perform supplemental tests that would otherwise be skipped.

If the determination at decision step 106 is negative, then it is concluded that an unrelated client request has been made. For example, the client may have requested transmission of test results, or a display illustrating the profile of a test. Control proceeds to step 116, where this request is processed.

Next, at step 112 a response to the client request is assembled. Test information obtained in step 114, a JAD file obtained in step 110, or information relating to the request processed in step 116, whichever is applicable, is now concatenated with the client's unique identifier.

Next, at step 118, the response assembled at step 112 is downloaded to the requesting client. Control then returns to delay step 102, where the next client request is awaited.

Further details of the method shown in FIG. 4 are disclosed in copending commonly assigned application Ser. No. 10/767,850, entitled Parallel Test Execution on Low-End Emulators and Devices, which is herein incorporated by reference.

Dynamic Load Distribution.

As disclosed above, and with continued reference to FIG. 3, the test framework 40 maintains a dynamic record of the correspondence between test bundles and clients (devices). Therefore, whenever a particular client sends a request, e.g., a request to provide another test, the test framework 40 responds by accessing the JAR file containing the appropriate next test of a current test bundle for that client. Further details of the server-side operation are shown a code fragment in Listing 7.

The number of tests in a test bundle is user configurable, and the size of each JAR file may be limited by the user. Thus, the number of tests downloadable to the client in a single JAR file is also limited, both by the size restriction imposed by the user on the JAR file, and by the constant overhead of the agent 54, which is typically about 20K, and which must be included in the JAR file. For instance, if the user has limited the JAR file to 60K, then 20K are preempted by the agent 54, leaving 40K available for test classes, and for whatever additional classes may be required to support execution of the test classes. During configuration of a session of the test framework 40, as many JAR files are created as may be needed to contain all the tests of a given test suite, taking all the above-noted factors into consideration, and maintained on a stack. When a request is received from a client, the test framework 40 associates the next element on the stack with the requesting client, and creates an appropriate JAD file on-the-fly, which is then downloaded to the requesting client as explained hereinabove. Assignment of the tests to be performed in the JAD file takes into consideration the number of clients connected to the test framework 40 in order to equitably distribute the test load among all the clients upon request. Alternatively, various algorithms may be used to accomplish this. For example, the tests may be allocated by number. Alternatively, the tests may be weighted according to the time required to perform each of them, and the tests then distributed according to weighted scores. For example, two tests each requiring one hour to perform could be assigned to a first client using a first JAD file. Four tests each requiring ½ hour to perform could be assigned to a second client using a second JAD file. Both clients would complete their assignments in the same two-hour interval, but the second client would perform twice as many tests as the first client. Further implementation details are provided in the code fragment of Listing 8.

It will also be recalled that whenever a new client is connected to the server 22, a unique ID is assigned to the client. Additionally, the test framework 40 recognizes the new client as being connected. The user may dynamically add as many devices as he wishes during the course of the session, while tests are running on currently attached devices. The test framework 40 creates a stack of test bundles, and associates a test bundle with each new client.

It is also possible to dynamically remove a client during the course of the session, even while the client is engaged in test execution. This can be accomplished simply by physically disconnecting it from the server 22. However, because a JAR file is already associated with this client by a unique ID, no other device can complete the incomplete tests included in that particular JAR file (other than an illegal client, that is a client that has been improperly recognized under the identifier of the previously disconnected client). At the test framework 40, the test executing at the time the client was removed is marked by a special code (VM_EXIT). Upon completion of the session all unexecuted tests in the JAR file will have been marked as "not run", unless the client is reconnected in order to complete the tests in the test bundle.

Figure 5:
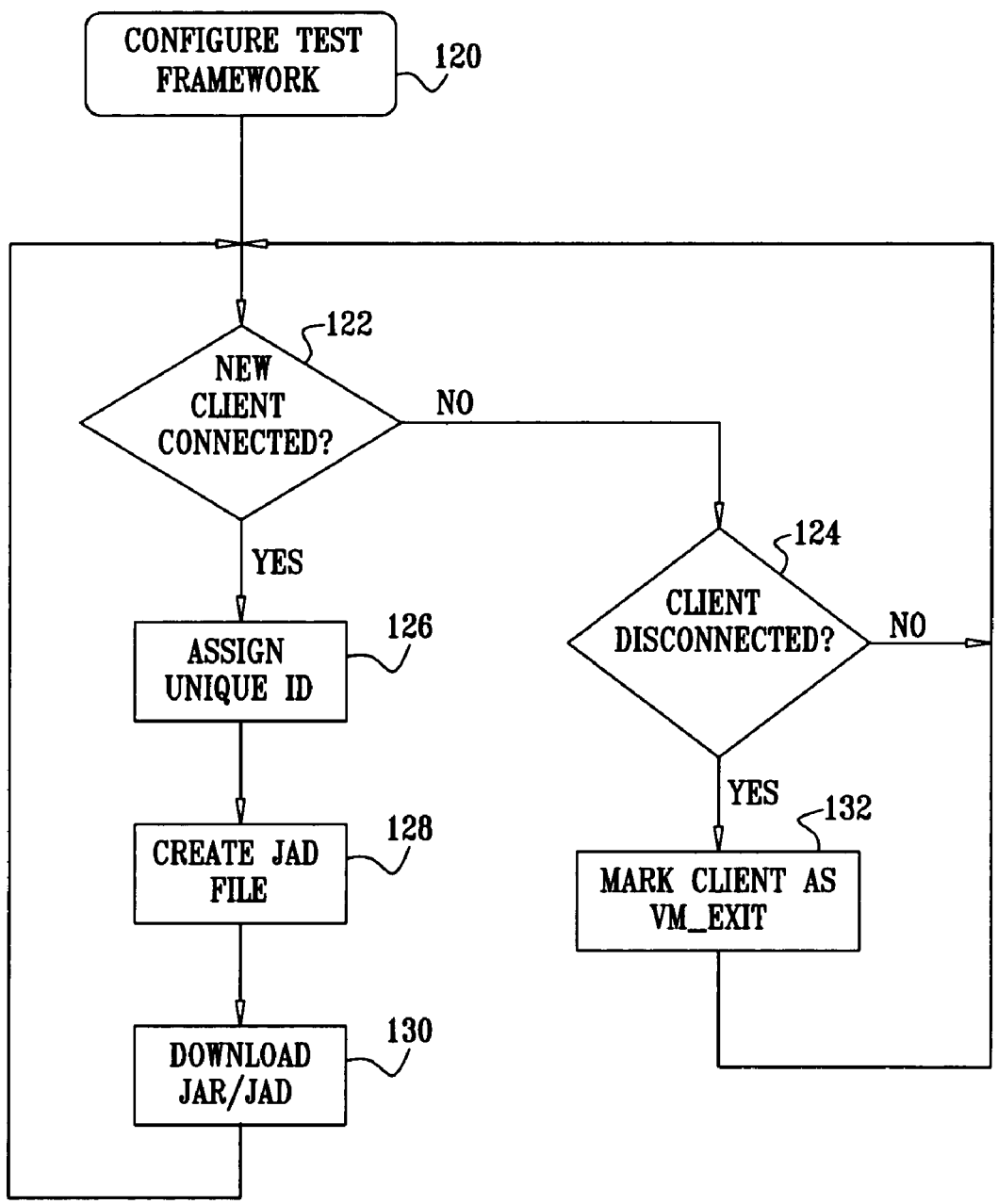
FIG. 5 is a flow chart illustrating a method of dynamic test load distribution in accordance with a disclosed embodiment of the invention.

Reference is now made to FIG. 5, which is a flow chart illustrating a method of dynamic test load distribution in accordance with a disclosed embodiment of the invention. The method begins at initial step 120, in which a test framework prepares test bundles for execution. JAR files are configured, taking into account the memory considerations disclosed above.

Control now proceeds to decision step 122, where it is determined if a new client has been connected to the test framework. If the determination at decision step 122 is negative, then control proceeds to decision step 124, which is disclosed below.

If the determination at initial step 120 is affirmative, then control proceeds to step 126. Here a unique identifier is assigned to the new client as disclosed above.

Next, at step 128, test assignments are prepared for the new client. A JAD file is prepared, which includes the tests of a test bundle that are to be performed. The test framework here takes into account the number of tests that have been selected for each client to run, and the client's configuration, in order to most equitably distribute the test load.

Next, at step 130 the JAD file prepared in step 128 and a corresponding JAR file are downloaded to the client, which proceeds to execute the tests as disclosed above. Control then returns to decision step 122.

Decision step 124 is performed if the determination at decision step 122 is negative. Here it is determined if a client that has been connected to the test framework has been disconnected, or has gone off-line. If the determination at decision step 124 is negative, then control returns to decision step 122.

If the determination at decision step 124 is affirmative, then control proceeds to step 132. Here the test framework marks the client as having exited. If the client is not subsequently reconnected during the session, then upon completion of the session, the test currently being performed by the disconnected client and all other tests assigned to the disconnected client will be noted as not having been run. Control now returns to decision step 122.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for testing computing devices, the method comprising:
   providing a suite of test programs on a server for execution by a plurality of said computing devices that are coupled to said server;
   distributing different ones of said test programs from said server to said computing devices for concurrent execution thereof by said computing devices;
   receiving messages from said computing devices upon completion of said execution of said distributed test programs; in response to receiving said messages, iterating said step of distributing test programs until all of said test programs in said suite have been executed;
   in response to one of said computing devices being detached from said server, marking unexecuted ones of said test programs that were distributed to said one of said computing devices to indicate that these test programs were not executed by said one of said computing devices.

2. The method according to claim 1, wherein said test programs are distributed as JAR files and JAD files.

3. The method according to claim 2, wherein said JAD files are constructed responsively to said messages.

4. The method according to claim 1, further comprising:
   dynamically coupling a new computing device to said server; and
   reallocating said test programs to said computing devices and said new computing device.

5. The method according to claim 1, further comprising prior to distributing said test programs for execution,
   receiving requests at said server from said computing devices requesting said server to provide test programs to said computing devices; and
   receiving additional requests at said server from said computing devices with respect to said execution of said test programs to determine a next test to execute at each of the corresponding computing devices.

6. The method according to claim 1, wherein said distributing test programs comprises removing said different ones of said test programs from a stack.

7. The method according to claim 1, wherein said distributing test programs comprises assigning said different ones of said test programs in groups comprising a plurality of said test programs so as to minimize a completion time of said suite.

8. A computer software product, comprising a computer-readable storage medium in which computer program instructions are stored, which instructions, when read by a computer, cause the computer to perform a method for testing computing devices, the method comprising:
   accessing a suite of test programs on a server for execution by a plurality of said computing devices that are coupled to said server;
   distributing different ones of said test programs from said server to said computing devices for concurrent execution thereof by said computing devices;
   receiving messages from said computing devices upon completion of said execution of said distributed test programs;
   in response to receiving said messages, iterating said step of distributing test programs until all of said test programs in said suite have been executed;
   in response to one of said computing devices being detached from said server, marking unexecuted ones of said test programs that were distributed to said one of said computing devices to indicate that these test programs were not executed by said one of said computing devices.

9. The computer software product according to claim 8, wherein said test programs are distributed as JAR files and JAD files.

10. The computer software product according to claim 9, wherein said computer is further instructed to construct said JAD files responsively to said messages.

11. The computer software product according to claim 8, wherein said computer is further instructed to perform the steps of:
    dynamically coupling a new computing device to said server; and
    reallocating said test programs to said computing devices and said new computing device.

12. The computer software product according to claim 8, wherein said computer is further instructed to perform the step of:
    dynamically detaching said one of said computing devices from said server.

13. The computer software product according to claim 8, wherein said distributing test programs comprises removing said different ones of said test programs from a stack.

14. The computer software product according to claim 8, wherein said distributing test programs comprises assigning said different ones of said test programs in groups comprising a plurality of said test programs so as to minimize a completion time of said suite.

15. A method for testing computing devices, the method comprising: providing a suite of test programs on a server for execution by a plurality of said computing devices that are coupled to said server; receiving requests at said server from said computing devices requesting said server to provide test programs to said computing devices; assigning a respective unique identifier to each of said computing devices, for use in communicating with said server; making respective allocations comprising different ones of said test programs for said computing devices; distributing said different ones of said test programs from said server to said computing devices for concurrent execution thereof by said computing devices; receiving messages at said server from said computing devices upon completion said execution of said distributed test programs, wherein each of said messages includes a request to determine a next test to execute at the corresponding computing device and also includes said respective unique identifier; in response to receiving said messages, iterating said step of distributing test programs until all of said test programs in said suite have been executed; detaching an attached one of said computing devices from said server; and marking unexecuted ones of said test programs that were distributed to said one of said computing devices to indicate that these test programs were not executed by said one of said computing devices.

16. The method according to claim 15, wherein said step of making respective allocations is performed so as to minimize a completion time of said suite of test programs.

17. The method according to claim 15, further comprising:
coupling a new computing device to said server; and
reallocating said test programs to said computing devices and said new computing device.

18. The method according to claim 15, wherein said computing devices comprise MIDP-compliant devices, and
wherein said test programs comprise MIDlets, which are packaged in respective JAD files and JAR files, and
wherein allocating said test programs comprises downloading said JAD files and said JAR files to said MIDP-compliant devices.

19. A computer software product, comprising a computer-readable storage medium in which computer program instructions are stored, which instructions, when read by a computer, cause the computer to perform a method for testing computing devices, the method comprising: accessing a suite of test programs that are stored on a server for execution by a plurality of said computing devices that are coupled to said server; receiving requests at said server from said computing devices requesting said server to provide test programs to said computing devices; assigning a respective unique identifier to each of said plurality of said computing devices, for use in communicating with said server; making respective allocations comprising different ones of said test programs for said computing devices; distributing said different ones of said test programs from said server to said computing devices for concurrent execution thereof by said computing devices; receiving messages at said server from said computing devices upon completion said execution of said distributed test programs, wherein each of said messages includes a request to determine a next test to execute at the corresponding computing device and also includes said respective unique identifier; in response to receiving said messages, iterating said step of distributing test programs until all of said test programs in said suite have been executed detaching one of said computing devices from said server; and marking unexecuted ones of said test programs that were distributed to said one of said computing devices to indicate that these test programs were not executed by said one of said computing devices.

20. The computer software product according to claim 19, wherein said step of making respective allocations is performed so as to minimize a completion time of said suite of test programs.

21. The computer software product according to claim 19, wherein said computer is further instructed to perform the steps of:
coupling a new computing device to said server; and
reallocating said test programs to said computing devices and said new computing device.

22. The computer software product according to claim 19, wherein said computing devices comprise MIDP-compliant devices, and
wherein said test programs comprise MIDlets, which are packaged in respective JAD files and JAR files, and
wherein allocating said test programs comprises downloading said JAD files and said JAR files to said MIDP-compliant devices.

23. A server for testing computing devices, comprising:
a communication interface for coupling a plurality of said computing devices thereto; and
a processor configured to access a suite of test programs for execution by said computing devices that are coupled to said server;
wherein said processor is configured to distribute different ones of said test programs via said communication interface to said computing devices for concurrent execution thereof by said computing devices;
wherein said processor is configured to receive messages via said communication interface from said computing devices indicating completion of said execution of said distributed test programs;
wherein, in response to receiving said messages, said processor is configured to distribute remaining ones of said test programs iteratively to said computing devices for execution thereof until all of said test programs in said suite have been executed;
wherein, in response to one of said computing devices being detached from said server, said processor is configured to mark unexecuted ones of said test programs that were distributed to said one of said computing devices to indicate that these test programs were not executed by said one of said computing devices.

24. The server according to claim 23, wherein said test programs are distributed as JAR files and JAD files.

25. The server according to claim 24, wherein said JAD files are constructed responsively to said messages.

26. The server according to claim 23, wherein, in response to a new computing device being coupled to said server, said processor is configured to reallocate said test programs to said computing devices and said new computing device.

27. The server according to claim 23, wherein said processor is configured to:
prior to distributing said test programs for execution, receive requests at said server from said computing devices requesting said server to provide test programs to said computing devices; and
receive additional requests at said server from said computing devices with respect to said execution of said test programs to determine a next test to execute at each of the corresponding computing devices.

28. The server according to claim 23, wherein said processor is further configured to assign said different ones of said test programs in groups comprising a plurality of said test programs so as to minimize a completion time of said suite.

29. A server for testing computing devices, comprising: a communication interface for coupling a plurality of said computing devices thereto; and a processor configured to access a suite of test programs for execution by said computing devices that are coupled to said server; wherein said processor is configured to receive requests from said computing devices requesting said server to provide test programs to said computing devices; wherein said processor is configured to assign a respective unique identifier to each of said computing devices for use in communicating with said server; wherein said processor is configured to make respective allocations comprising different ones of said test programs for said computing devices; wherein said processor is configured to distribute said different ones of said test programs from said server to said computing devices for concurrent execution thereof by said computing devices; wherein said processor is configured to receive messages from said computing devices indicating completion of said execution of said distributed test programs, wherein each of said messages includes a request to determine a next test to execute at the corresponding computing device and also includes said respective unique identifier; wherein, in response to receiving said messages, said processor is configured to distribute remaining ones of said test programs iteratively to said computing devices for execution thereof until all of said test programs in said suite have been executed; wherein, in response to one of said computing devices being detached from said server, said processor is configured to mark unexecuted ones of said test programs that were distributed to said one of said computing devices to indicate that these test programs were not executed by said one of said computing devices.

30. The server according to claim 29, wherein, in response to a new computing device being coupled to said server, said processor is configured to reallocate said test programs to said computing devices and said new computing device.

31. The server according to claim 29, wherein said computing devices comprise MIDP-compliant devices, and said test programs comprise MIDlets, which are packaged in respective JAD files and JAR files, and wherein said processor has further instructions to allocating said test programs by downloading said JAD files and said JAR files to said MIDP-compliant devices.

* * * * *